UNITED STATES PATENT OFFICE.

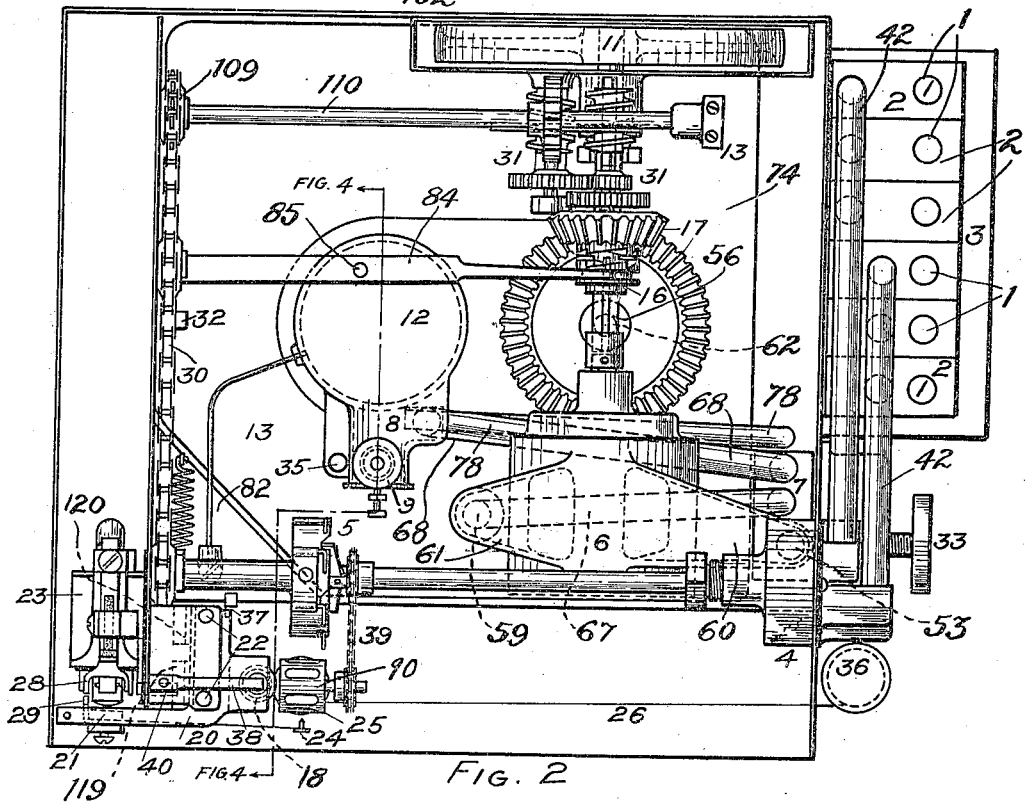

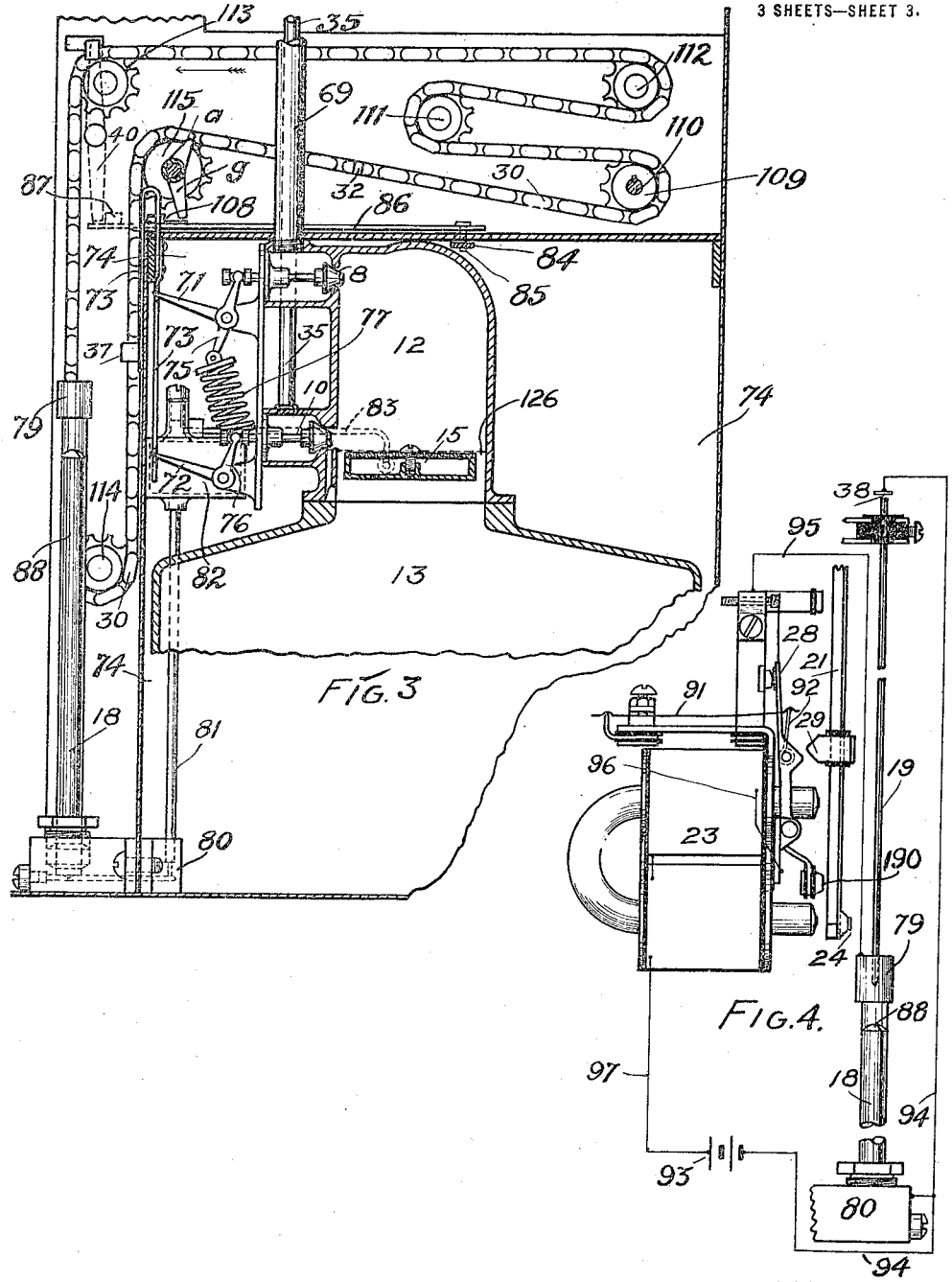

LAURENCE A. STENGER, OF DENVER, COLORADO.

GAS-TESTING MACHINE.

1,320,584.   Specification of Letters Patent.   Patented Nov. 4, 1919.

Application filed October 14, 1918. Serial No. 257,939.

*To all whom it may concern:*

Be it known that I, LAURENCE A. STENGER, a citizen of the United States, residing at Denver, in the county of Denver and State of Colorado, have invented certain new and useful Improvements in Gas-Testing Machines, of which the following is a specification, reference being had therein to the accompanying drawing.

My invention relates to gas testing machines and especially to a gas testing machine for determining and recording the volumetric proportion of carbon dioxid in the flue or exhaust gases of furnaces or the like.

An object of the invention is to provide a testing machine which will serve a plurality of sources and record the results of the tests on a common record sheet, identifying the different records with the particular sources from which they were obtained.

A further object of the invention is to provide a compact and unitary machine which may be readily connected with any number of different sources of gas to be tested, within the number for which it is designed.

Other objects of my invention will be apparent from the following specification.

My invention is illustrated in the accompanying drawings in which—

Fig. 2 is a plan view with certain portions omitted for the sake of clearness.

Fig. 3 is a vertical section through the gas chamber showing the gas valves, the arrangement of the sprocket chain, and some of the control mechanism operated thereby.

Fig. 4 is a fragmentary view showing the electro-magnetic recording means and the circuit connections therefor.

Fig. 5 is a detail view, partly in section, of the selector valve and the automatic operating means therefor.

Fig. 6 is an end view of the selector valve connecting head.

Fig. 7 is a section taken on the line 7—7 of Fig. 5, showing the selector valve dog.

Fig. 8 is a section taken on the line 8—8 of Fig. 5 showing a face view of the automatic controlling mechanism for the selector valve.

Fig. 9 is a fragmentary side view of Fig. 8 showing a set of controlling notches and the disabling means therefor.

Figure 1:
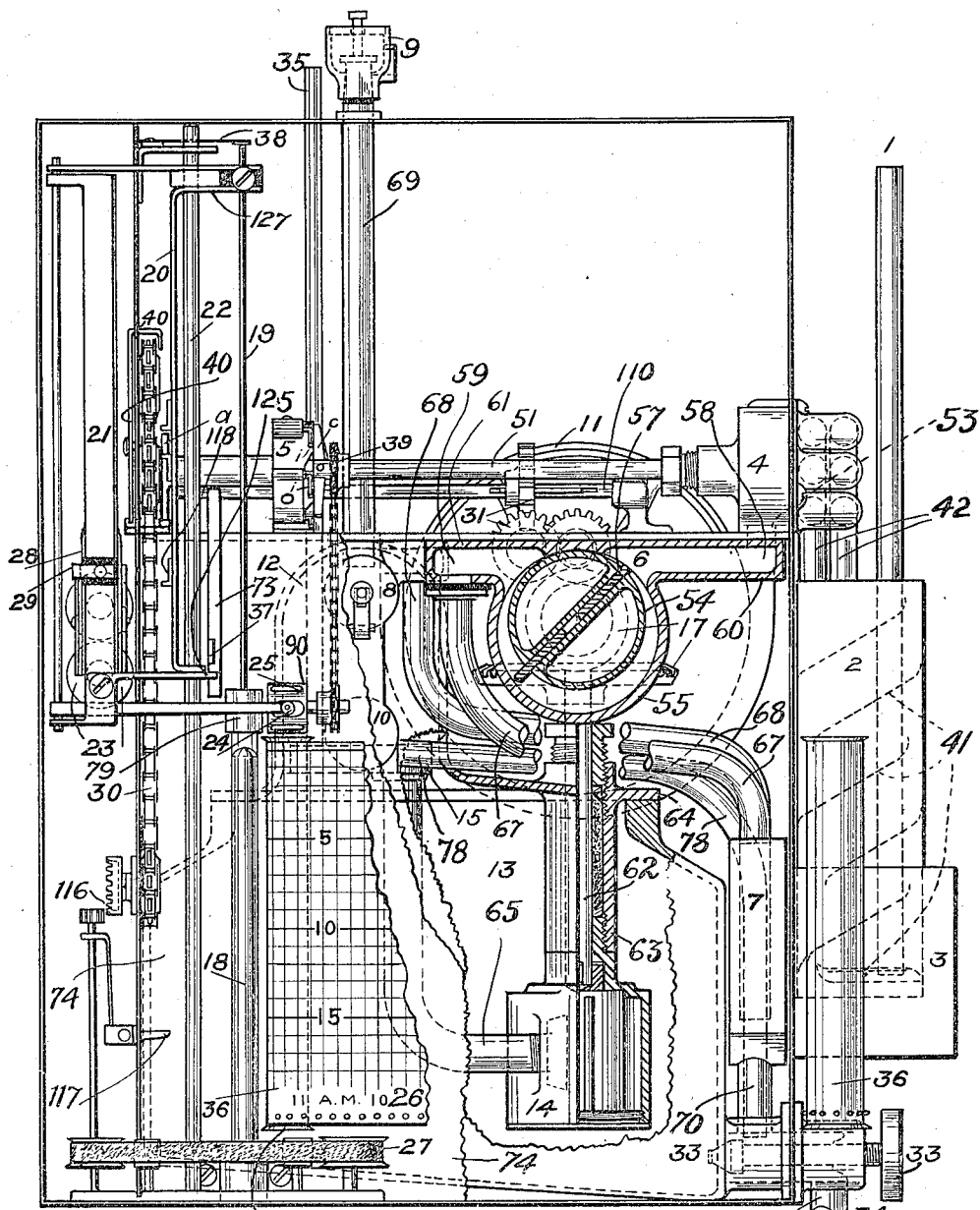
Figure 1 is a front elevation of the machine with the front wall of the casing removed and other portions broken away to show the internal arrangement.

Referring to the drawings in detail, 1 shows the intake pipes to be connected to the different sources of gases to be tested. These intake pipes connect with the machine first through the gas cleaning compartments 2, one for each pipe. Each compartment is provided with a set of removable baffle plates 41, arranged as indicated in dotted lines in Fig. 1. These compartments dip in water contained in tank 3 and are so arranged as to cause the gas sample to pass down through the pipe 1 below the bottom horizontal baffle, through the water and up around the several baffles to the top of the compartment 2, thus freeing the samples from dust and soot. These impurities are deposited in the tank 3 and may be readily removed when necessary.

From the top of each cleaning compartment 2, pipes 42 lead to the individual connectors 43 on the selector valve connecting head 44 of the selector valve 4.

The selector valve consists of the cylindrical chamber 45 on one end of which is secured the connector head 44 which carries the tubular connectors 43. The inner side of the connector head is provided with a valve seat 45 having openings 46 through which the bores or openings in the tubular connectors communicate with the interior chamber 47 of the selector valve. A rotatable valve disk 48 is arranged to contact with the valve seat 45 and provided with a single perforation 49 arranged to be successively brought into registration with the different openings 46 upon rotation of the valve disk. The valve disk 48 is pressed against the valve seat 46 by a suitable compression spring 50 and rotated by the valve shaft 51. The selector valve 4 is provided with an outlet connection 52 communicating with the valve chamber 47 and from which connection is made to the intake of the gas pump 6. This connection is shown at 53 in Figs. 1 and 2.

The gas pump 6 is designed to operate continuously, driven by an electric motor or other source of power through the pulley wheel 11 mounted on the pump shaft. The gas pump is shown in plan view in Fig.

2 and in section in Fig. 1. The gas pump 6 is of the rotary type, having a slotted drum 54 set eccentrically in a cylindrical casing 55 and arranged to be rotated by the pump shaft 56. Set in the drum slots are two sliding vanes 57 which are held in contact with the casing by centrifugal force during rotation of the drum. The inlet and outlet ports 58 and 59, respectively, of the pump are openings through tangential extensions 60 and 61, respectively, of the pump casing.

The solution pump 14 is of the same general design as the gas pump just described, and it is situated within the solution tank 13 and driven by the pump shaft 62 extending through the pump 14 to the outside of the tank 13 through the pump supporting sleeve and stuffing box 63 carried by the solution tank cover 64. The pump shaft 62 is arranged to be intermittently operated from the shaft 56 through bevel gears 17 and the clutch 16. The solution tank 13 is preferably of iron and contains a suitable absorbing solution such as a solution of caustic potash or caustic soda. The pump 14 operates to force the solution from the tank 13 through the conduit 65 and sprinkling head 15 into the gas chamber 12 from which the solution returns to the tank 13. The gas chamber 12 is formed integral with or in fixed relation to the cover 64. The bottom of the solution tank 13 is arranged to incline toward a drainage valve 33 connected in one side of the tank near the bottom, and arranged when open to drain the tank through the drainage pipe 66, the pipe 66 being suitably water-sealed in any well known manner.

The outlet port 59 of the gas pump 6 is connected through a tube 67 to a baffled condenser 7 for cooling the gases and disposing of the moisture therein. From the condenser 7 the gas is led through a tube 68 through the inlet valve 8 to the gas chamber 12. The outer side of the valve 8 is connected through a tube 69 to atmosphere through a valve 9, through which excess gas is discharged upon closure of the valve 8. Gas leaves the chamber 12 through the outlet valve 10 and tube 35. The condenser 7 is provided with a drainage pipe 70 connected with the pipe 66 which is provided with a suitable water seal to prevent the escape of gas.

The gas pump 6 is preferably constantly operated and the charging and scavenging of the gas chamber 12 are controlled by the valves 8 and 9. The valves 8 and 9 are operated by the bell-crank levers 71 and 72 respectively which are arranged to be operated together by a rod 73 which extends up over and down the outside wall of the compartment 74 and carries at its outer end an operating lug by which the rod 73 is raised and lowered in a manner to be hereinafter described. Arranged to move in fixed relation to bell-crank levers 71 and 72 are the valve holding arms 75 and 76 respectively which are moved in opposite directions as the bell-crank levers are moved either up or down and are held apart under tension by a suitable compression spring 77 which thus tends to hold the valves 8 and 9 in the extreme position to which they have been last moved.

The solution tank 13 is filled through the pipe 69 leading to the valve 9 after opening gas valves 8 and 9. As the solution expands by use the excess is removed together with any foam that is formed in the gas chamber when the outlet valve 10 is opened during regular operation, thus maintaining the volume of the gas chamber constant. This removal of surplus liquid and foam is effected through the use of a drainage pipe 78 which leads in a downwardly inclined direction from the outer side of the valve 10 through a water-seal, not shown, by way of the pipe 34.

A suitable mercury gage of the inverted siphon type is connected with the gas chamber 12 for indicating the pressure therein. This consists of the gage tube 18 preferably of glass, having a perforated cap 79 of suitable electrical conducting material such as metal, at the top, and connected at the bottom through a connecting block 80 with the tube 81 which leads to the chamber or reservoir 82 having a horizontal area much greater than that of the indicating tube 18. From the top of the chamber 82 a connecting tube 83 leads to the interior of the gas chamber 12. As the top of the tube 18 is open to atmosphere, variations of the pressure within the gas chamber 12 will result in variations in the level of the mercury in the chamber 82 and in the indicating tube 18, the variations of mercury level in the tube 18 being greater than those in the chamber 82 because of the greater area of the latter.

It should be here noted that the solution tank 13, gas pump 6, tubing, gas chamber 12 and gearing 17 are placed in liquid to provide good running conditions for the mechanism and to maintain equal temperatures for the successive analyses. This liquid is contained in the compartment 74. The clutch 16 for intermittently connecting the solution pump 14 is operated by the lever 84 pivoted at 85 and connected to one end of a sliding link 86 which carries a lug 87 operated in a manner to be hereinafter described.

For recording the different indications of the mercury column 88 in the gage 18, I provide an electromagnetic recording device arranged to record the height of a mercury column on a chronometrically driven record tablet 26. The record tablet 26 consists of a sheet graduated vertically in volumetric percentages of carbon dioxid, and horizontally in units of time, the sheet being arranged to remain vertically stationary and to be moved horizontally by being unwound from a supply roller 89 onto a storage roller 36 driven by a suitable clock train not shown, in accordance with the chronometric gradnation on the record sheet.

The recording means consists of a carriage 20 suitably mounted on a pair of guide rods 22 in frictional engagement therewith so as to remain in the position last placed. This carriage carries a contact needle 19 insulated from the carriage and arranged to move downwardly through the cap 79 in electrical contact therewith into the gage tube 18, as the carriage moves downwardly. The carriage 20 also carries a pivoted armature 21 to which is attached a recording plummet 24 arranged to pass down over the record tablet 26, normally out of engagement therewith, as the carriage moves downwardly. This armature is made substantially equal in length to the length of travel of the carriage and is acted upon by a stationary electro-magnet 23 mounted so as to be in operative relation to the armature in all positions of the carriage. Just above the record supply roller 89 is mounted a changeable inking device 90 so arranged that the plummet 24 will be in operative relation therewith when the carriage is in its uppermost position. The plummet 24 is mounted on the armature in such manner that when the armature is attracted by the magnet 23, the plummet will be brought into contact with one of the pads 25 on the inking device 90 or with the record tablet 26, according to the position of the carriage. Just below the supply roller 89, a cleaning belt 27 is mounted in a manner to be engaged by the plummet when the carriage reaches its lowermost position. The contact 28 is arranged to open the circuit of the magnet 23, each time the armature 21 is attracted, by the armature striking the insulated stud 190. The movable member of the contact 28 is held against accidental movement in either opened or closed position by means of an off-center holding device consisting of the leaf spring 91 and link 92. For energizing the magnet 23 upon arrival of the plummet 24 into operative relation with the inking device, a cam 29 is so mounted on the armature 21 as to engage a complementary projection on the movable member of the contacting device 28 just before the armature reaches its uppermost position which partially closes the energizing circuit of magnet 23, which circuit is completed upon closure of the contact 38 adjusted to close upon arrival of the plummet 24 in the exact position for engagement with the inking device. The energizing circuit thus completed may be traced from battery 93 through conductor 94, contact 38, contact needle 19, cap 79, conductor 95, contact 28, conductor 96, magnet 23, conductor 97 back to battery 93. For energizing the magnet 23 to bring the recording plummet 24 into engagement with the record tablet, the energizing circuit of the magnet 23 is completed through the contact of the needle 19 with the mercury column 88 in the tube 18 and may be traced as follows: Battery 93, conductor 94, connecting block 80, which is of metal or other conducting material, mercury column 88, contact needle 19, cap 79, conductor 95, contact 28, conductor 96, magnet 23, and back through conductor 97 to battery 93.

The selector valve 4 is operated to successively connect the gas pump 6 with different sources by means of a selector switch 5 controlling the movement of the valve shaft 51. This selector switch consists of a stationary cylinder $d$ and an oscillating cylinder $b$ nested within the stationary cylinder and having a sleeve extension 98 journaled on the shaft 99. The sleeve is provided with an operating dog $a$ and an arm $g$ connected to a fixed portion of the frame by a retractile spring 100 tending to hold the inner cylinder $b$ in a given normal position. Keyed to the shaft 99 is a disk $e$ positioned within the inner cylinder and carrying an abutment 102 on its face. The valve shaft 51 carries a pawl $c$ having an operating finger 103 and a clutch arm 104 on opposite sides of its pivot, the operating finger being arranged to fall into any one of a number of registering notches 105 and 106 in the cylinders $b$ and $d$, respectively, equal in number to the number of sources served by the apparatus. The pawl $c$ is provided with a holding spring 107 arranged to normally hold the operating finger in one of the sets of notches in the concentric cylinders with the clutch arm 104 out of engagement with the projection 102. The notches 105 and 106 are arranged with a cam surface at one side as shown so that upon slight rotation of the inner cylinder $b$, in a clockwise direction, the flat side in the notch 106 will push the finger 103 against the cam surface of the notch 105 raising the finger out of the notches and depressing the clutch arm 104 into the path of the extension or projection 102 so as to be rotated with the disk $e$ until the finger reaches the next succeeding set of notches into which it moves by virtue of the spring 107. For rendering any number of the notches inoperative, I provide a disabling means for each notch which consists of an arm $i$ pivoted in a manner to be swung across the notch to form a bridge for the operating finger 103 and cause it to pass on to the next open notch. The lower arm $g$ of the dog $a$ is extended down into operative engagement with the lug 108 on the clutch operating link 86 so that when the dog is rotated in a clockwise direction (see Fig. 3), the arm $g$ will engage with the lug 108 on the clutch operating link 86 to move it to the left.

To operate the different parts in proper time relation, I provide a sprocket chain 30 driven by the sprocket wheel 109 through the shaft 110 and gearing 31 which may be arranged in any well known manner for varying the speed of the shaft 110 in relation to the driving wheel 11. From the driving sprocket 109, the chain passes over the idler sprockets 111, 112 and 113 and thence over operating sprockets 114 and 115 back to the driving sprocket. The sprocket 114 is furnished to operate the cleaning belt 27 through the gears 116 arranged to be thrown into mesh upon downward movement of the arm 117, which is effected by engagement therewith of the lug 118 on the carriage 20. The sprocket 115 is geared to the shaft 99 which operates the selector switch mechanism 5. One link on the sprocket chain 30 is provided with an extension 32 arranged to engage the dog $a$, the upper end of the lever 40 and the outer and inner operating lugs 119 and 120 respectively, of the carriage 20, successively.

For identifying the different records with the different sources tested, the inking device 90 is made in the form of a drum carrying a plurality of inking pads 25 equal in number to the number of sources which the machine is designed to serve, and of different colors. The inking device 90 is connected through suitable motion transmitting means such as the sprocket chain 39, with the valve shaft 51 in a manner to rotate the inking device in constant angular relation with the said shaft and hence the selector valve so that upon each adjustment of the selector valve a corresponding inking pad 25 is brought into operative relation with the plummet 24.

The operation of my device is as follows: Assuming the intake pipes 1 to be connected to the several different sources of gas to be analyzed, the pulley wheel 11 connected to be constantly driven at a given rate by a suitable source of power, and the record sheet 26 set to the time of starting, the cycle of operation may be assumed to begin when the gas chamber valves 8 and 10 are closed. While the valves 8 and 10 are open, the valve 9 is automatically held closed by the drop in pressure, and gas is circulated through the gas chamber 12 by the constantly actuated gas pump 6, the path of travel of the gas being as follows: One of the intake pipes 1, and its associated cleaner 2, connector pipe 42, selector valve 4, gas pump intake 58, cylinder 55, gas pump outlet 59, pipe 67, condenser 7, charging pipe 68, valve 8, gas chamber 12, valve 10, outlet pipe 35 to atmosphere. The sprocket chain 30 travels in the direction indicated by the arrow at the top of Fig. 3 and carries the timing extension or lug 32 around with it which upon passing around the sprocket 114 and upwardly to the sprocket 115, engages the lifting lug 120 on the carriage 20, sliding the carriage upwardly on the guide rods 22. As the carriage moves upwardly the projection 125 thereon engages the operating lug 37 on the lever rod 73, raising it and with it the levers 71 and 72 as shown in Fig. 3 to close both the valves 8 and 10. This causes a quantity of gas to be trapped in the gas chamber 12 at atmospheric pressure, filling the space in the chamber 12 above the level of the absorbing solution, which level is indicated by the dotted line 126.

The carriage 20 continuing its upward movement carries the armature 21 and with it the lug 29 upwardly and into engagement with the lever arm of the contact 28, moving the contact 28 into closed position as indicated in Fig. 4 and when the carriage reaches a position to bring the plummet 24 into the proper position to engage the inking device 90, a contact rod 19 makes contact with the contact spring 38 which closes the energizing circuit of the magnet 23. The magnet 23 upon energization attracts the armature 21 bringing the plummet 24 into engagement with the inking pad 25 corresponding to the source of the gas now contained in the gas chamber 12, thus inking the plummet with ink of a proper identifying color. Immediately upon the attraction of the armature 21, it engages the insulating stud 190 which swings the contact 28 into open position thus causing the magnet 23 to become deënergized and release the armature 21 which moves the plummet 24 out of engagement with the inking pad 25 as indicated in Fig. 2.

The timing lug 32 now passing over the sprocket 115 moves out of engagement with the lifting lug on the carriage, the carriage remaining in its raised position due to its frictional engagement with the guide rods 22. The timing lug 32 in moving over the sprocket 115 engages the dog $a$ which rotates the sleeve 98 and with it the cylinder $b$ of the switching device 5. The rotation of the cylinder $b$ causes the selecting finger 103 to be pushed up out of the slot 5 in which it has been held, which causes the lever $c$ to rock on its pivot throwing the clutch arm 104 into the path of the projection 102 on the clutch disk $e$. The clutch disk $e$ which is being constantly rotated by the shaft 99 and sprocket 115 causes the projection 102 to engage with the clutch arm 104 and carry it around in a clockwise direction (see Fig. 8) until the finger 103 reaches the next succeeding open notch 105 into which it drops, swinging the clutch arm 104 out of engagement with the projection 102.

The lever *c* in traveling around to the next open notch 105, carries with it the shaft 51 of the selector valve 4, which movement of the selector shaft operates the selector valve to connect another source of gas with the gas pump, corresponding to the notch into which the lever *c* has fallen. The rotation of the shaft 51 also operates through the motion transmission means 39 to rotate the inking device 90 to bring in front of the plummet another ink pad 25 corresponding to the source of gas now connected with through the selector valve. The partial rotation of the cylinder 98 causes the arm *g* to be rocked over to the left (see Fig. 3), engaging the lug 108 on the sliding link 86 which operates the clutch lever 84 to close the clutch 16, connecting the gears 17 with the constantly rotating pump shaft 56. This sets the solution pump 14 into operation which takes solution from the tank 13 and forces it up through the solution pipe 65 through the spray nozzle 15, spraying the solution up into the gas chamber 12 from whence it falls back into the solution tank 13 mingling with the main body of solution which is maintained at the level indicated by the dotted line 126 (Fig. 3). When the lug 32 leaves the dog *a* it is restored to the normal position by the spring 100 carrying with it the inner cylinder *b* back to its normal position with all the notches open. The lug 32 then continues around over the sprockets 110, 111, 112 and 113, and in passing over 113 engages the upper end of the arm 40 switching the lower end to the right which engages the lug 87 on the link 86, operating the lever 84 to again open the clutch 16 and stopping the solution pump 14.

The absorption of the carbon dioxid from the gas contained in the chamber 12 produces a partial vacuum therein directly proportional to the volumetric percentage of carbon dioxid which is indicated by the degree of depression of the mercury in the gage tube 18.

The actual analysis is now completed and remains to be recorded. As the timing lug 32 continues its travel downward from the sprocket 113 it engages with the carriage lowering lug 119 (Fig. 2). As the recorder carriage 20 moves down the lug 29 on the armature 21 again engages the lever arm of the contact 28 moving the contact 28 into the closed position as indicated in Fig. 4, and as the carriage continues its downward movement the contact needle 19 is brought into contact with the mercury in the tube 18 whereupon the circuit of the magnet 23 is completed in a manner previously described, and the armature 21 momentarily attracted to tap the plummet 24 on the record sheet 26 making a mark at a point on the sheet corresponding to the percentage of carbon dioxid in the sample tested, the mark being of a color indicating the source from which the sample was taken. The carriage continuing to the lower limit of its travel causes the plummet 24 to come in contact with the cleaning belt 27, and the belt clutch 116 to be closed by engagement of the lug 118 with the clutch arm 117 which sets the belt 27 in motion to clean the remaining ink from the plummet. A little before the carriage reaches its lowermost position the upper portion 127 of the carriage engages the lug 37 of the valve rod 73 throwing the valve levers 71 and 72 down to open both the valves 8 and 10. Upon opening of the valves 8 and 10, gas from the gas pump taken from the next source to be analyzed is circulated through the gas chamber 12 clearing it of the residue of the gas last tested which completes the cycle of operation. During the closure of the valves 8 and 10, the excess gas from the pump escapes through the pipe 69 and valve 9.

When it is desired to omit the taking of samples through certain of the intake pipes 1, the disabling arms *i* are moved to bridge the notches 105 and 106 in the selector switch 5 corresponding to such intake pipes.

Certain advantages may be obtained by filling the displacement space above the mercury surface in the tank 82 with mineral oil which will be drawn back and forth into the gas chamber. It will thus act as a non-compressible connecting medium between the gas chamber and the mercury gage, prevent contact of the gases with the mercury and prevent the useless absorption of carbon dioxid when the gas valves are open.

While I have herein described and illustrated a particular embodiment of my invention, for the purpose of disclosure, it is to be understood that I do not limit myself to such embodiment but contemplate all such modifications and variants thereof as may fairly fall within the scope of the appended claims.

Having thus described my invention what I claim and desire to secure by Letters Patent is

1. In a gas analyzer, a solution tank, a gas chamber in communication therewith, a pressure gage connected with said gas chamber, means for charging the gas chamber with a predetermined volume of gas, means for closing the gas chamber to atmosphere, and means for spraying a solution from said solution tank through the gas chamber back to the solution tank.

2. In a gas analyzer, a solution tank, a gas chamber in communication with said solution tank, a pressure gage connected with the gas chamber, means for charging the gas chamber with a predetermined volume of gas, means for closing the gas chamber to atmosphere, means for spraying a solution from said solution tank through said gas chamber back to said solution tank, and means for timing the operation of said charging, closing and spraying means.

3. In a gas analyzer, a solution tank, a gas chamber, a pressure gage connected with said gas chamber, means for charging the gas chamber with a predetermined volume of gas to be analyzed, means for selectively connecting said charging means with any one of a plurality of sources, means for closing the gas chamber to atmosphere, means for spraying a solution from said solution tank through said gas chamber back to said solution tank, and means for timing the operation of said charging, closing and spraying means.

4. In a gas analyzer, a solution tank, a gas chamber, a pressure register connected with said gas chamber, means for charging the gas chamber with a predetermined volume of gas to be analyzed, means for selectively connecting said charging means with a plurality of sources of gas, means for closing the gas chamber to atmosphere, means for spraying a solution from said solution tank into said gas chamber, said solution tank being arranged to receive the sprayed solution from said gas chamber, a record tablet recording means controlled by said pressure register and operable to record the pressure on said tablet, means for associating the record produced by said recording means with the particular source analyzed, and means for timing the operation of the selective connecting means, charging means, closing means, spraying means and recording means.

5. In a gas analyzer, a solution tank, a gas chamber, a pressure register connected with said gas chamber, means for charging the gas chamber with a predetermined volume of gas to be analyzed, means for selectively connecting said charging means with a plurality of sources of gas, means for closing the gas chamber to atmosphere, means for spraying a solution from said solution tank into said gas chamber, said solution tank being arranged to receive the sprayed solution from said gas chamber, means for predetermining the number of selections to be made by said selecting means, means for recording the pressure indicated by said pressure register, and means operated in unison with said selecting means to identify the record with reference to the source of gas last connected with.

6. In a gas analyzer, a solution tank, a gas chamber communicating therewith, a mercury pressure gage connected with said gas chamber and having a mercury column arranged to move in proportion to the degree of vacuum in said gas chamber, a record tablet, a plurality of ink pads, a recorder carriage, a record marker carried by said carriage, to move the same over said pads and said record normally out of engagement therewith, electromagnetic means operable upon energization to cause said record marker to momentarily engage one of said pads or said record according to its position, means for closing the energizing circuit of said electromagnetic means operable upon movement of said record marker into engaging position with the pads, means movable with said marker arranged to contact with the upper surface of said mercury column to close the energizing circuit of said electromagnetic means, means for charging said gas chamber, a plurality of gas supply conduits equal in number to the number of ink pads, means for selectively connecting said charging means with said supply conduits, means operable upon the connection of a given conduit to move a given pad into position to be engaged by said marker, controlling means for said charging means, controlling means for said selective means, and a movable member timed in its movement and arranged to move said marker and to operate both said controlling means in timed relation.

7. In a gas analyzer, a solution tank containing an absorbing solution, a gas chamber in communication therewith, means for charging the gas chamber with a predetermined volume of gas, means for closing the gas chamber to isolate the charge from atmosphere, means for mixing the solution and the gas, and a pressure gage connected with said gas chamber through an inert, non-compressible fluid extending into the gas chamber, and lying on the surface of the solution in a manner to normally isolate it from the gas chamber.

8. In a gas analyzer, a rigid walled gas container, means for charging said container with a predetermined volume of gas to be analyzed, means for isolating the interior of said container from the atmosphere, means for absorbing a constituent of the gas in said container while so isolated, and a pressure gage connected with said gas chamber through the medium of a non-compressible fluid extending from the movable member of the gage to the interior of the gas chamber, whereby error due to compression of the medium connecting the gas chamber and the gage is avoided.

In testimony whereof I affix my signature.

LAURENCE A. STENGER.

Witnesses:
JASON I. ELLSWORTH,
H. W. DAHLBERG.